Patented Mar. 10, 1942

2,276,174

UNITED STATES PATENT OFFICE 2,276,174

AZO DYESTUFFS

Richard Fleischhauer and Adolf Müller, Frankfort-on-the-Main-Fechenheim, Germany, assignors to General Aniline & Film Corporation, a corporation of Delaware No Drawing. Application March 25, 1939, Serial No. 264,188. In Germany April 2, 1938

6 Claims. (Cl. 260—199)

The present invention relates to azo-dyestuffs.
We have found that new valuable ortho-dihydroxy-azo-dyestuffs are obtained by combining in an alkaline medium the diazo compound of ortho-aminophenol or one of its substitution products with a coupling component of the following general Formula I

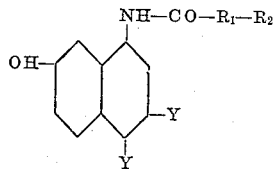

wherein
$R_2$ represents alkyl, cycloalkyl, aralkyl of the benzene series or aryl of the benzene series,
$R_1$ stands for the group —NH— or —O—,
one Y represents a sulfonic acid group and the other Y is hydrogen.

There are obtained, for instance, dyestuffs of the following general formula:

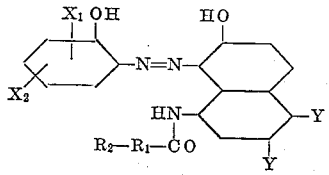

wherein
$X_1$ and $X_2$ represent members of the group consisting of hydrogen, chlorine, bromine, methyl, nitro, acylamino and sulfonic acid,
one Y represents a sulfonic acid group and the other Y represents hydrogen,
$R_1$ represents a member of the group consisting of —NH— and —O— and
$R_2$ represents a member of the group consisting of alkyl, cycloalkyl, aralkyl of the benzene series and aryl of the benzene series.

The new dyestuffs yield, on after-chroming on the fiber, valuable vivid grey tints of very good fastness to fulling and to light. In most cases, they are, moreover, distinguished by a good levelling power and a good fastness to carbonizing.

As compared with known dyestuffs derived from a 1-acetylamino-7-hydroxynaphthalene-monosulfonic acid, the new dyestuffs are distinguished by the surprising fact that, when the dyeings are subjected to the action of chromium salts, the tints are shifted to vivid bluish or greenish-grey tints. In general, the dyestuffs obtained according to the present process display better fastness properties than the corresponding known dyestuffs containing an acetyl radical, and they are, in most cases, not changed in artificial light.

The coupling components of the above Formula I may be prepared as follows: Those of them in which the symbol $R_1$ stands for oxygen may be prepared by the action of an alkyl, aralkyl, cycloalkyl or aryl ester of chloroformic acid upon 1-amino-7-hydroxynaphthalene-3-sulfonic acid or 1-amino-7-hydroxynaphthalene-4-sulfonic acid. The coupling components wherein the symbol $R_1$ is the —NH— group, may be obtained by causing an aryl, aralkyl, cycloalkyl or alkyl ester of isocyanic acid or the correspondingly substituted carbamic acid chlorides to act upon an aqueous solution of 1-amino-7-hydroxynaphthalene-3-sulfonic acid or 1-amino-7-hydroxynaphthalene-4-sulfonic acid, if desired in the presence of an acid-binding agent. As to the 1-amino-7-hydroxynaphthalene - 3 - sulfonic acid, it may preferably be prepared by sulfonating 1-amino-7-hydroxynaphthalene or by melting 1-amino-naphthalene - 3.7 - disulfonic acid with an alkali, under pressure, whereas 1-amino-7-hydroxynaphthalene-4-sulfonic acid is obtained, for instance, by melting 1-aminonaphthalene-4.7-disulfonic acid with a caustic alkali and causing the 1.7-dihydroxynaphthalene-4-sulfonic acid thus obtained to react with ammonia, in the presence of sodium sulfite.

The following examples serve to illustrate the invention, but they are not intended to limit it thereto; the parts are by weight:

(1) 18.9 parts of 2-amino-1-hydroxybenzene-4-sulfonic acid are diazotized in the usual manner. The diazo-solution thus obtained is then run into a solution of 32 parts of 1-carbethoxy-amino-7-hydroxynaphthalene-3-sulfonic acid to which an excess of sodium carbonate has been added, and the mixture is stirred, until the coupling is complete.

The dyestuff is separated and dried; it then forms a violet powder which dissolves very easily in water. In dilute mineral acids and dilute acetic acid, it dissolves to form a red solution; in the presence of alkalies its aqueous solution is blue. In concentrated sulfuric acid, the dyestuff dissolves to form a bluish-red solution; it dyes wool, in an acid bath, red tints having a very good levelling power which tints, on after-chroming, turn to a neutral grey of very good fastness to light, fulling and potting and of good fastness to carbonizing.

If, instead of 1-carbethoxy-amino-7-hydroxy-naphthalene-3-sulfonic acid, there are used compounds containing other alcohol radicals, such as 1-carbomethoxyamino-7-hydroxynaphthalene-3-sulfonic acid, 1-carbobutoxyamino-7-hydroxynaphthalene-3-sulfonic acid, 1-carbohexyloxyamino-7-hydroxynaphthalene-3-sulfonic acid or 1-carbododecyloxyamino-7-hydroxynaphthalene-3-sulfonic acid, dyestuffs are obtained which, on after-chroming, dye the woollen fiber similar fast grey tints.

(2) A diazo solution from 14.4 parts of 4-chloro-2-amino-1-hydroxybenzene is run into a solution of 32 parts of 1-carbethoxyamino-7-hydroxynaphthalene-3-sulfonic acid to which an excess of sodium carbonate has been added, and the mixture is stirred, until the coupling is terminated.

The dyestuff is separated and dried; it constitutes a dark blue powder which dissolves easily in water. In the presence of a mineral acid or acetic acid, its aqueous solution is red, in the presence of alkalies it has a blue coloration. In concentrated sulfuric acid, the dyestuff dissolves to form a bluish-red solution. It dyes wool, in an acid bath, red tints which, on after-chroming, turn to bluish-grey tints having a very good fastness to light and a good fastness to potting and fulling.

(3) 16.8 parts of 6-nitro-4-methyl-2-amino-1-hydroxybenzene are diazotized, and the suspension of the diazo compound is introduced into a solution of 32 parts of 1-carbethoxyamino-7-hydroxynaphthalene-4-sulfonic acid containing an excess of sodium carbonate. After stirring for a prolonged period of time, the coupling is complete. The dyestuff is separated and dried. It is a dark-blue powder which dissolves in water, in the presence of a mineral acid, to a red solution; in the presence of sodium carbonate, it dissolves in water to a blue solution, and when dissolved in concentrated sulfuric acid, it gives rise to the formation of a bluish-red solution. The dyestuff thus obtained dyes wool, in an acid bath, red tints which, on after-chroming, turn greenish-grey and have then very good fastness properties.

(4) 18 parts of 4.6-dichloro-2-aminophenol are diazotized in the usual manner, the diazo compound is salted out and separated. The paste thus obtained is introduced into a solution of 32 parts of 1-carbethoxyamino-7-hydroxynaphthalene-3-sulfonic acid containing an excess of sodium carbonate and the whole is stirred, until the coupling is complete. The dyestuff is separated and dried; it constitutes a greenish-blue powder which dissolves in water to a blue solution and in dilute mineral acids to a red solution. In concentrated sulfuric acid it dissolves to a bluish-red solution. The dyestuff thus obtained dyes wool, in an acid bath, violet tints which on after-chroming are converted into vivid blue-grey tints of very good fastness properties, especially as regards the fastness to fulling, potting, carbonizing, decatizing and to light; they are not changed by artificial light. The dyestuff may also be dyed according to the meta-chromium process; it has a good levelling power.

The corresponding dyestuff from 1-carbethoxy-amino-7-hydroxynaphthalene-4-sulfonic acid is distinguished by a still better solubility; when after-treated with chromium salts on wool, it yields blue-grey tints which are somewhat more reddish but have the same good fastness properties.

(5) 14.4 parts of 6-chloro-2-aminophenol are diazotized and the diazo solution is combined with a solution of 32 parts of 1-carbethoxyamino-7-hydroxynaphthalene-3-sulfonic acid containing an excess of sodium carbonate. When the coupling is complete, the dyestuff is separated and dried. It is a dark powder which dissolves in water to a violet solution, in concentrated sulfuric acid to a red solution and which dyes wool, in an acid bath, Bordeaux tints which, on after-chroming, are converted into reddish-grey tints which, besides other good properties, display a very good fastness to light and a good levelling power.

A dyestuff having very similar properties is obtained if there is used 1-carbethoxyamino-7-hydroxynaphthalene-4-sulfonic acid.

(6) 18 parts of 4.6-dichloro-2-aminophenol are diazotized in the usual manner. The diazo compound is then introduced into a solution of 36.5 parts of 1-(carbocyclohexyloxy)-amino-7-hydroxynaphthalene-3-sulfonic acid containing an excess of sodium carbonate, and the mixture is stirred at ordinary temperature until the diazo compound has disappeared. After filtering and drying, the dyestuff constitutes a dark powder which dissolves in water and in a sodium carbonate solution to a violet-blue solution and in concentrated sulfuric acid to a bluish-red solution; in an acid bath, it dyes wool violet tints which, on after-chroming are converted into vivid blue-grey tints of very good fastness to light, fulling, potting and carbonizing. When after-chromed, the dyeings are not changed in artificial light. The dyestuff may also be dyed according to the meta-chrome process.

If instead of 4.6-dichloro-2-aminophenol, there is used as diazo component 4-chloro-6-bromo-2-aminophenol, 4-bromo-6-chloro-2-aminophenol or 4.6-dibromo-2-aminophenol, dyestuffs having similar tinctorial properties are obtained.

If the 1-(carbocyclohexyloxy)-amino-7-hydroxynaphthalene-3-sulfonic acid is replaced by 1-(carbobenzyloxy)-amino-7-hydroxynaphthalene-3-sulfonic acid, 1-(carbophenyloxy)-amino-7-hydroxynaphthalene-3-sulfonic acid, 1-(carbo-2'-methyl-phenyloxy)-amino-7-hydroxynaphthalene-3-sulfonic acid or 1-(carbo-4'-methoxy-phenyloxy)-amino-7-hydroxynaphthalene-3-sulfonic acid, there are obtained dyestuffs which, when after-chromed on the fiber, likewise yield value fast blue-grey tints.

The corresponding dyestuffs for which the analogous acyl derivatives of 1-amino-7-hydroxynaphthalene-4-sulfonic acid are used as coupling components, yield on after-chroming somewhat redder, covered grey tints having the same good fastness properties.

(7) 14.4 parts of 4-chloro-2-aminophenol are diazotized and the diazo compound thus obtained is combined with a solution of 36.5 parts of 1-(carbocyclohexyloxy)-amino-7-hydroxynaphthalene-4-sulfonic acid containing an excess of sodium carbonate. The dyestuff is separated and dried, it is a violet powder which dissolves in water to a violet solution, in concentrated sulfuric acid to a red-violet solution and in a sodium carbonate solution to a bluish-violet solution. The dyestuff dyes wool Bordeaux tints which, on after-chroming, turn to very fast grey tints.

The corresponding dyestuff prepared from the same diazo component and from 1-(carbocyclohexyloxy)-amino-7-hydroxynaphthalene-3-sulfonic acid yields when after-chromed somewhat more vivid and more bluish grey tints having the same fastness properties.

(8) 14.4 parts of 6-chloro-2-aminophenol are diazotized and the diazo solution thus obtained is combined with a solution of 37.3 parts of 1-(carbobenzyloxy)-amino-7-hydroxynaphthalene-3-sulfonic acid containing an excess of sodium carbonate. When the coupling is complete, the dyestuff is separated and dried; it is a dark blue powder which dissolves in water to a reddish-blue solution and in concentrated sulfuric acid to a red solution. In a bath acidified with acetic acid, it dyes wool Bordeaux tints which on after-chroming turn to a reddish-grey of very good fastness properties.

(9) 16.8 parts of 4-methyl-6-nitro-2-aminophenol are diazotized, and the diazo suspension thus obtained is combined with a solution of 37.3 parts of 1-(carbobenzyloxy)-amino-7-hydroxynaphthalene-3-sulfonic acid containing an excess of sodium carbonate. The dyestuff is separated and dried; it is a dark blue powder which dissolves in water or in a sodium carbonate solution to a blue solution, in concentrated sulfuric acid to a bluish-red solution. It dyes wool violet tints which, on after-chroming, turn to a very fast blue-grey.

If the equivalent amount of the diazo compound from 4-chloro-6-nitro-2-aminophenol is combined with the same coupling component, a dyestuff is obtained which dyes wool blue tints which, on after-chroming, turn to a very fast greenish-grey; the use of 4-nitro-2-aminophenol as diazo component leads to a dyestuff which dyes wool dirty violet tints which, on after-chroming, are converted into very fast bluish-olive shades.

(10) A diazo-solution prepared from 22.4 parts of 4-chloro-2-aminophenol-6-sulfonic acid is run into a solution of 37.3 parts of 1-(carbobenzyloxy)-amino-7-hydroxynaphthalene-3-sulfonic acid containing an excess of sodium carbonate and the whole is stirred until the coupling is complete. The dyestuff is separated and dried; it is a blue powder which dissolves in water to a violet solution and in mineral acids to a red solution. In an acid bath, it dyes wool red tints which, on after-chroming, turn to blue-grey tints of good fastness properties, especially a good fastness to light, to fulling and potting.

(11) 17.8 parts of 4.6-dichloro-2-aminophenol are diazotized and the diazo compound is separated. The paste thus obtained is introduced into a solution of 35.8 parts of N-phenyl-urea of 1-amino-7-hydroxynaphthalene-3-sulfonic acid containing an excess of sodium carbonate, and the whole is stirred until the coupling is complete. The dyestuff is separated and dried; it is a dark blue powder which dissolves in a sodium carbonate solution to a blue solution and in concentrated sulfuric acid to a bluish-red solution. It dyes wool, in an acid bath, violet tints which, on after-chroming, turn to greenish blue-grey tints of very good fastness properties which are especially beautiful in artificial light.

(12) A solution of the diazo compound from 14.4 parts of 6-chloro-2-amino-1-hydroxybenzene is caused to run into a solution of 35.8 parts of N-phenyl-urea of 1-amino-7-hydroxynaphthalene-3-sulfonic acid containing an excess of sodium carbonate and the whole is stirred until the coupling is complete. The dyestuff is separated and dried; it is a dark blue powder which dissolves in water to a violet solution, in dilute mineral acids and in concentrated sulfuric acid to a red solution. It dyes wool Bordeaux tints which, on after-chroming, turn to a neutral grey having very good properties of fastness.

Dyestuffs having quite similar shades and the same good fastness properties are obtained if the coupling component is, for instance, the N-butyl-urea, cyclohexyl-urea or benzyl-urea of 1-amino-7-hydroxynaphthalene-3-sulfonic acid; the use of the corresponding urea of 1-amino-7-hydroxynaphthalene-4-sulfonic acid leads to dyestuffs which when after-chromed on the fiber yield somewhat more covered shades. The diazo components may be varied within large limits; there may especially be used the amino-phenols indicated in Examples 1 to 10 and in the following table.

Further dyestuffs obtainable according to the present invention are indicated in the following table:

| Diazo component | Coupling component | Dissolves in— | | Tint of the after-chromed dyeing on wool |
| --- | --- | --- | --- | --- |
| | | Concentrated sulfuric acid to a— | A sodium carbonate solution to a— | |
| 6-chloro-2-amino-1-hydroxybenzene-4-sulfonic acid. | 1-carbethoxy-amino-7-hydroxynaphthalene-3-sulfonic-acid. | Red solution | Violet solution | Grey. |
| 4-methyl-2-amino-1-hydroxybenzene-6-sulfonic acid. | do | Bluish-red solution. | Blue solution | Blue-grey. |
| 4-chloro-2-amino-1-hydroxybenzene-6-sulfonic acid. | do | do | Violet solution | Do. |
| 4.6-dichloro-2-amino-1-hydroxybenzene. | 1-carbomethoxyamino-7-hydroxynaphthalene-3-sulfonic acid. | do | do | Do. |
| 2-amino-1-hydroxybenzene-4-sulfonic acid. | 1-carbethoxyamino-7-hydroxynaphthalene-4-sulfonic acid. | Red solution | Bluish-red solution. | Grey. |
| 6-nitro-2-amino-1-hydroxybenzene-4-sulfonic acid. | do | do | Blue solution | Green-grey. |
| 6-nitro-4-methyl-2-amino-1-hydroxybenzene. | 1-carbomethoxyamino-7-hydroxynaphthalene-3-sulfonic acid. | Bluish-red solution. | do | Greenish-grey. |
| 4-chloro-6-nitro-2-amino-1-hydroxybenzene. | do | do | do | Do. |
| 4-chloro-5-nitro-2-amino-1-hydroxybenzene. | do | do | Violet solution | Green-grey. |
| 5-nitro-2-amino-1-hydroxybenzene. | 1-carbethoxyamino-7-hydroxynaphthalene-3-sulfonic acid. | do | Reddish-blue | Do. |
| 6-chloro-4-nitro-2-amino-1-hydroxybenzene. | do | Red solution | Bluish-red solution. | Olive-grey. |
| 4-nitro-2-amino-1-hydroxybenzene. | do | do | do | Do. |
| 4-nitro-2-amino-1-hydroxybenzene-6-sulfonic acid. | do | do | do | Green-grey. |
| 6-nitro-2-amino-1-hydroxybenzene-4-sulfonic acid. | do | do | do | Do. |
| 4.6-dinitro-2-amino-1-hydroxybenzene. | do | do | Red solution | Olive-grey. |
| 4.6-dichloro-2-amino-1-hydroxybenzene-sulfonic acid, obtained by sulfonation of 4.6-dichloro-2-aminophenol. | do | Bluish-red solution. | Reddish-blue solution. | Grey. |
| 4-chloro-2-amino-1-hydroxybenzene. | (Carbo-1-isobutoxy)-amino-7-hydroxynaphthalene-3-sulfonic acid. | do | Blue solution | Bluish-grey solution. |

We claim:
1. The compounds of the general formula:

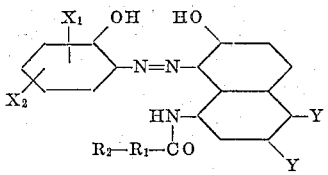

wherein $X_1$ and $X_2$ represent members of the group consisting of hydrogen, chlorine, bromine, methyl, nitro, acylamino and sulfonic acid,
one Y represents a sulfonic acid group and the other Y represents hydrogen,
$R_1$ represents a member of the group consisting of —NH— and —O— and
$R_2$ represents a member of the group consisting of alkyl, cycloalkyl, aralkyl of the benzene series and aryl of the benzene series,
said compounds being dyestuffs which yield on wool, when after-treated with chromium salts on the fiber, valuable vivid grey tints of excellent fastness properties.

2. The compounds of the general formula:

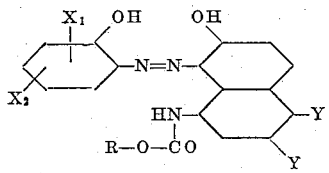

wherein $X_1$ and $X_2$ represent members of the group consisting of hydrogen, chlorine, bromine, methyl, nitro, acylamino, and sulfonic acid,
one Y represents a sulfonic acid group and the other Y represents hydrogen,
R represents a member of the group consisting of alkyl, cycloalkyl, aralkyl of the benzene series and aryl of the benzene series,
said compounds being dyestuffs which yield on wool, when after-treated with chromium salts on the fiber, valuable vivid grey tints of excellent fastness properties.

3. The compounds of the general formula:

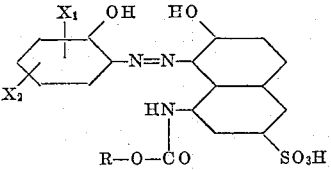

wherein $X_1$ and $X_2$ represent members of the group consisting of hydrogen, chlorine, bromine, methyl, nitro, acylamino, and sulfonic acid, R represents a member of the group consisting of alkyl, cycloalkyl, aralkyl of the benzene series and aryl of the benzene series,
said compounds being dyestuffs which yield on wool, when after-treated with chromium salts on the fiber, valuable vivid grey tints of excellent fastness properties.

4. The compound of the formula:

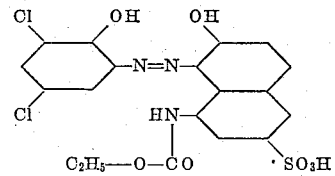

being a greenish-blue powder, which dissolves in water to a blue solution and in dilute mineral acids to a red solution and which dyes wool, in an acid bath, violet tints which, on after-chroming, turn to vivid blue-grey tints of very good fastness properties, especially to fulling, potting, carbonizing, decatizing and to light, these shades being not changed in artificial light.

5. The compound of the formula:

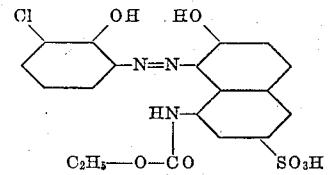

being a dark powder which dissolves in water to a violet solution and in concentrated sulfuric acid to a red solution and which dyes wool, in an acid bath, Bordeaux tints which, on after-chroming, turn to reddish-grey tints having besides other very good properties that of a very good fastness to light and a good levelling power.

6. The compound of the formula:

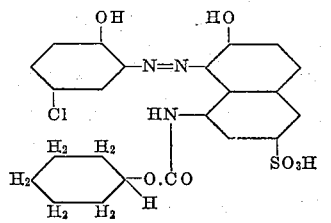

being a violet powder which dissolves in water to a violet solution, in concentrated sulfuric acid to a red-violet solution and which dyes wool Bordeaux-red tints which, on after-chroming, turn to a very fast bluish-grey.

RICHARD FLEISCHHAUER.
ADOLF MÜLLER.